(12) United States Patent
Youngers et al.

(10) Patent No.: US 9,625,080 B1
(45) Date of Patent: Apr. 18, 2017

(54) ASSEMBLY FOR HYDRAULIC FLUID ACTUATED MACHINE LEVELING

(71) Applicants: Stephen A. Youngers, Clearwater, KS (US); Neil J. Youngers, Viola, KS (US); James J. Youngers, Viola, KS (US); Patrick L. Emerson, Andover, KS (US); Stephen P. Dooley, Goddard, KS (US)

(72) Inventors: Stephen A. Youngers, Clearwater, KS (US); Neil J. Youngers, Viola, KS (US); James J. Youngers, Viola, KS (US); Patrick L. Emerson, Andover, KS (US); Stephen P. Dooley, Goddard, KS (US)

( * ) Notice: Subject to any disclaimer, the term of this patent is extended or adjusted under 35 U.S.C. 154(b) by 521 days.

(21) Appl. No.: 14/312,275

(22) Filed: Jun. 23, 2014

(51) Int. Cl.
*B66F 3/24* (2006.01)
*F16M 7/00* (2006.01)

(52) U.S. Cl.
CPC .................... *F16M 7/00* (2013.01)

(58) Field of Classification Search
CPC ...... B60S 9/00; B60S 9/04; B60S 9/12; B60S 9/20; B60S 11/00
See application file for complete search history.

(56) References Cited

U.S. PATENT DOCUMENTS

| | | | |
|---|---|---|---|
| 2,510,285 A | 6/1950 | Heyerman | |
| 3,236,489 A | 2/1966 | Mattocks | |
| 3,321,182 A | 5/1967 | Elenburg | |
| 3,578,278 A | 5/1971 | Pickering | |
| 4,046,354 A | 9/1977 | Stith, Jr. | |
| 4,135,392 A | 1/1979 | Young | |
| 4,494,376 A * | 1/1985 | Beaufort | E21B 19/08 166/77.4 |
| 4,500,071 A * | 2/1985 | Bagwell | B66F 7/04 254/423 |
| 4,592,532 A | 6/1986 | Stith, Jr. | |
| 4,846,436 A | 7/1989 | Young et al. | |
| 4,930,741 A | 6/1990 | Young et al. | |
| 5,065,844 A | 11/1991 | Hon | |
| 5,188,379 A | 2/1993 | Krause et al. | |
| 5,258,913 A | 11/1993 | Baldauf | |
| 5,797,227 A | 8/1998 | Garza-Tamez | |
| 6,193,219 B1 * | 2/2001 | Belley | E02F 9/003 254/89 H |
| 6,299,137 B1 | 10/2001 | Bainter | |
| 6,895,648 B1 | 5/2005 | Willett | |

(Continued)

*Primary Examiner* — Lee D Wilson
(74) *Attorney, Agent, or Firm* — Kenneth H. Jack; Davis & Jack, L.L.C.

(57) ABSTRACT

An assembly for machine leveling including a plurality of hydraulic cylinders having upper ends adapted for supporting the machine's base, a lower end, a shaft, and a port opening the cylinder; branch conduits having cylinder ends and pump ends, each branch conduit connecting to one of the ports; first shutoff valves connected to the branch conduits for alternatively permitting and resisting fluid flow within the branch conduits; a manifold conduit connected to the branch conduits; a hydraulic pump connected to the manifold conduit and adapted for raising hydraulic pressure within the manifold conduit to a shaft extending pressure; and an electrically modulated variable pressure relief valve connected to the manifold conduit and adapted for raising and lowering the hydraulic pressure.

14 Claims, 5 Drawing Sheets

(56) References Cited

U.S. PATENT DOCUMENTS

| | | |
|---|---|---|
| 2001/0025951 A1 | 10/2001 | Bainter |
| 2002/0017637 A1* | 2/2002 | Belley .................. B66F 7/20 254/89 H |
| 2007/0098494 A1 | 5/2007 | Mares |
| 2010/0032534 A1 | 2/2010 | Cho |
| 2011/0024706 A1 | 2/2011 | Schwindaman et al. |

* cited by examiner

ASSEMBLY FOR HYDRAULIC FLUID ACTUATED MACHINE LEVELING

FIELD OF THE INVENTION

This invention relates to apparatus and assemblies adapted for leveling and aligning precision equipment and machinery. More particularly, this invention relates to such assemblies which are adapted for precise control of upward extensions and downward retractions of the support shafts of hydraulic cylinder configured pedestals or feet.

BACKGROUND OF THE INVENTION

Computer numerical control or "CNC" milling machines often must be precisely "leveled" in a manner which causes the vertical orientations of support contact points upon the undersurface of the machine's base or chassis to coincide with a horizontal plane. Ideally, leveling procedures performed upon such machines eliminate any warping, deflection, or distortion of any of such support contact points away from the horizontal plane. Such machine leveling is known to be facilitated or accomplished by adapting a milling machine's floor contacting feet or pedestals to function as vertically extendable and retractable hydraulic cylinders. Operation of such cylinder pedestals through selective injections and ejections of hydraulic fluid to and from the cylinders' interior fluid filled volumes is known to align a machine's base with the horizontal plane. Where such cylinder pedestals are arranged beneath a heavy milling center machine in a support matrix, operation of the cylinder pedestals either individually or in groupings gives rise to significant difficulties, complexities, and challenges. In such leveling operations, various groupings of cylinder pedestals or individual cylinder pedestals are alternatively raised, lowered, locked against fluid flow, and opened for equipment "floating" interchange of fluid volumes. In any such equipment leveling task, a multitude of such alternative operations directed to the cylinder pedestals may be required to be performed. Known assemblies, machinery and equipment which facilitate such a operations are cumbersome in use and time consuming.

The instant inventive assembly for hydraulic fluid actuated machine leveling solves or ameliorates such difficulties and challenges by providing and associating with a machine supporting matrix of hydraulic cylinder configured pedestals a specialized network of hydraulic fluid carrying conduits wherein hydraulic fluid flow and pressure is controlled by incorporation of a specialized combination of shutoff valves and a variable relief valve.

BRIEF SUMMARY OF THE INVENTION

A first structural component of the instant inventive assembly for hydraulic fluid actuated machine leveling comprises a plurality of hydraulic cylinders, each hydraulic cylinder preferably being configured to function as a machine supporting foot or pedestal. In the preferred embodiment, each of the hydraulic cylinders includes a vertical extension shaft whose upper end is configured and adapted for contact with and support of the undersurface of a heavy machine such as a CNC milling machine.

The lower end of the hydraulic cylinder's extension shaft preferably comprises or is connected operatively to a piston which is slidably mounted within the cylinder for hydraulic fluid pressure controlled vertical motion. In the preferred embodiment, each of the cylinder pedestals comprises a one way hydraulic cylinder wherein the cylinder's expansion volume is opened by a port for alternative injections and ejections of pressurized hydraulic fluid.

Further structural components of the instant inventive assembly comprise a plurality of branch conduits, each conduit among the plurality of branch conduits having at least a first cylinder end and a pump end. In the preferred embodiment, each cylinder end of each branch conduit is connected for hydraulic fluid communicating flow into and out of the hydraulic fluid port of one of the cylinder pedestals. In the preferred embodiment, each of the branch conduits comprises a small gauge hydraulic line which is capable of conveying fluid at high pressure.

Further structural components of the instant inventive assembly comprise a plurality of first shutoff valves, each valve among the plurality of first shutoff valves preferably being connected operatively and "in line" with one of the branch conduits. Selective operation of the valves among the plurality of first shutoff valves advantageously allows an operator to alternatively permit and resist flows of the hydraulic fluid within any of the branch conduits or within any subgroup of such conduits.

A further structural component of the instant inventive assembly comprises a manifold conduit having a cylinder end and a pump end. In a preferred embodiment, the cylinder end of the manifold conduit is connected in communication with the pump ends of the branch conduits.

A further structural component of the instant inventive assembly comprises hydraulic fluid pressurizing means which are preferably connected operatively to the manifold conduit's pump end. In the preferred embodiments, the pressurizing means are adapted for raising the hydraulic fluid at the manifold conduit's pump end to a shaft extending and equipment raising pressure. The pressurizing means preferably comprises a hydraulic pump and motor means combination which is capable of continuously maintaining hydraulic fluid pressure at a level which is greater than or at least equal to the least amount of pressure needed to extend a maximally loaded cylinder pedestal among a machine supporting matrix of cylinder pedestals.

A further structural component of the instant inventive assembly comprises variable pressure relief means which are connected operatively to the pump end of the manifold conduit. The variable pressure relief means may suitably comprise a manually operated variable relief valve such as a screw actuated needle valve. However, for convenience and speed of operation, the variable pressure relief means preferably comprise an electrically modulated variable relief valve.

In operation of the instant inventive assembly, hydraulic fluid pressure supplied by the pressurizing means may be advantageously communicated in an infinitely variable fashion to any one of the cylinder pedestals or to any grouping of the cylinder pedestals via selective on/off operation of the first plurality of shutoff valves, and by varying the level or rate of pressure relief performed by the variable pressure relief means. The instant inventive assembly also conveniently and speedily facilitates floating or trading of equalized pressure between cylinder pedestals and groupings of cylinder pedestals.

In a preferred embodiment, all components of the assembly other than the cylinder pedestals and the cylinder ends of the branch conduits may be housed within and actuated from a control casing which may be configured for wheeled portability from milling machine to milling machine. Preferably, multiple machines supported by matrixes of cylinder pedestals may be served and leveled via portably moving the control case between machines, and by attaching and detaching such machines' sets of branch conduits to and from the control casing.

Accordingly, objects of the instant invention include the provision of an assembly for hydraulic fluid actuated machine leveling which incorporates structures, as described above, and which arranges those structures in relation to each other in manners described above for achievement of the benefits and functions described above.

Other and further objects, benefits, and advantages of the present invention will become known to those skilled in the art upon review of the Detailed Description which follows, and upon review of the appended drawings.

DETAILED DESCRIPTION OF PREFERRED AND ALTERNATIVE EMBODIMENTS

Figure 1:
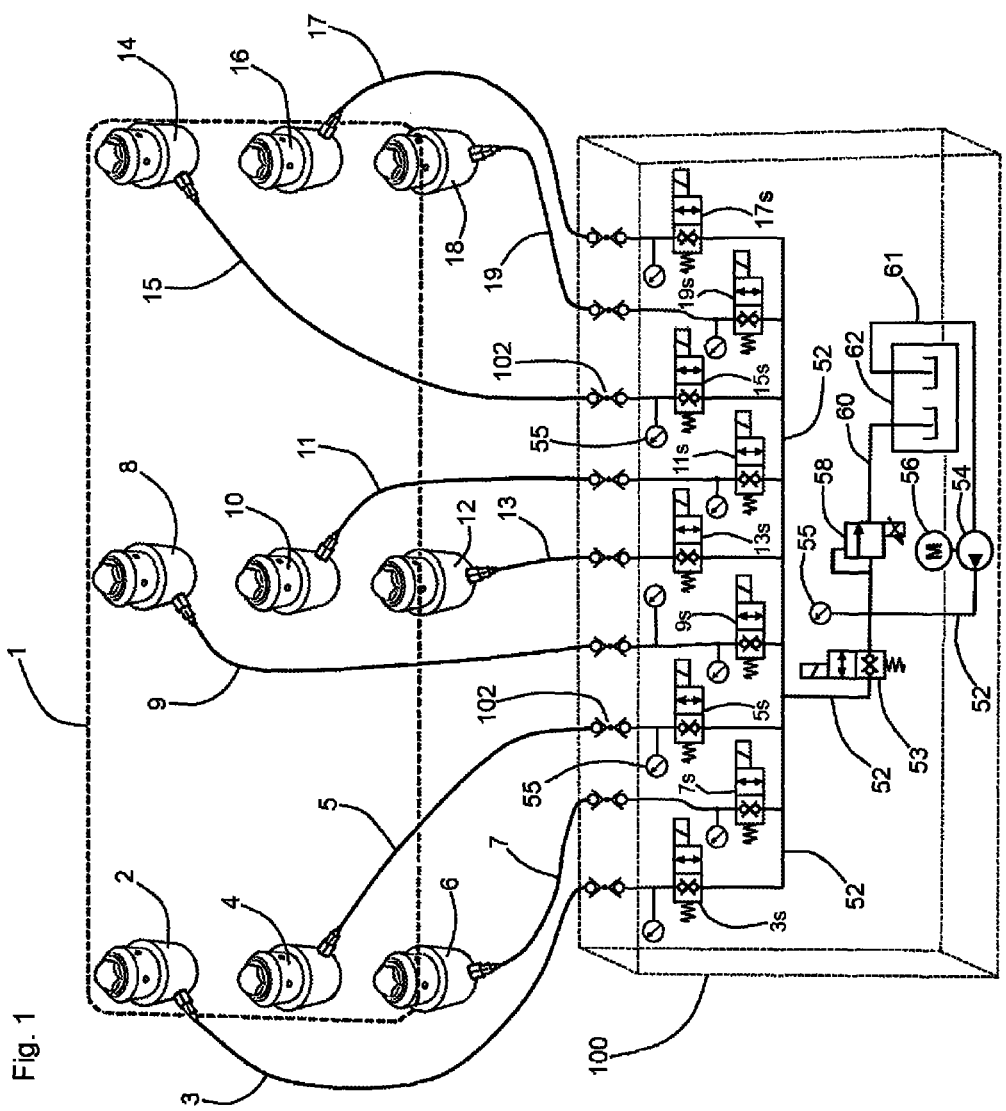
FIG. 1 presents in a semi-schematic fashion a preferred embodiment of the instant inventive assembly for hydraulic fluid actuated machine leveling.
Figure 4:
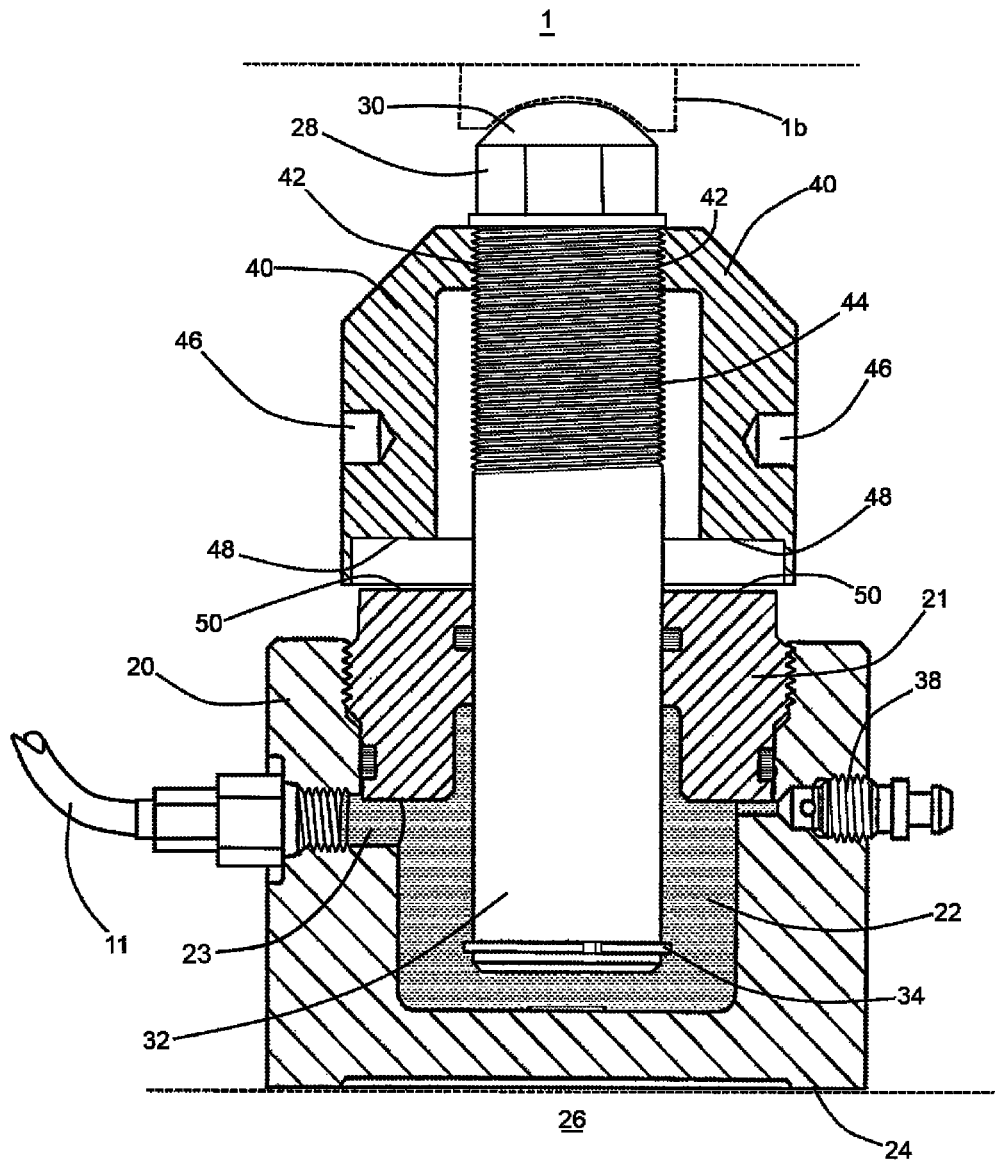
FIG. 4 is a sectional view as indicated in FIG. 3.

Referring now to the drawings, and in particular to FIGS. 1 and 4, the rectangular dashed line 1 is representative of a base or chassis lower end of an item of heavy precision equipment such as CNC milling machine or milling center. Such machine commonly includes an array or matrix of bearing or support points 1b upon the undersurface of the base.

A plurality of or matrix of hydraulic cylinder configured feet or pedestals 2, 4, 6, 8, 10, 12, 14, 16, and 18 are placed between such support points 1b and a floor 26 of a machine shop. Upon such positioning, the cylinder pedestals 2-18 provide foundation support to the machine 1.

Figure 3:
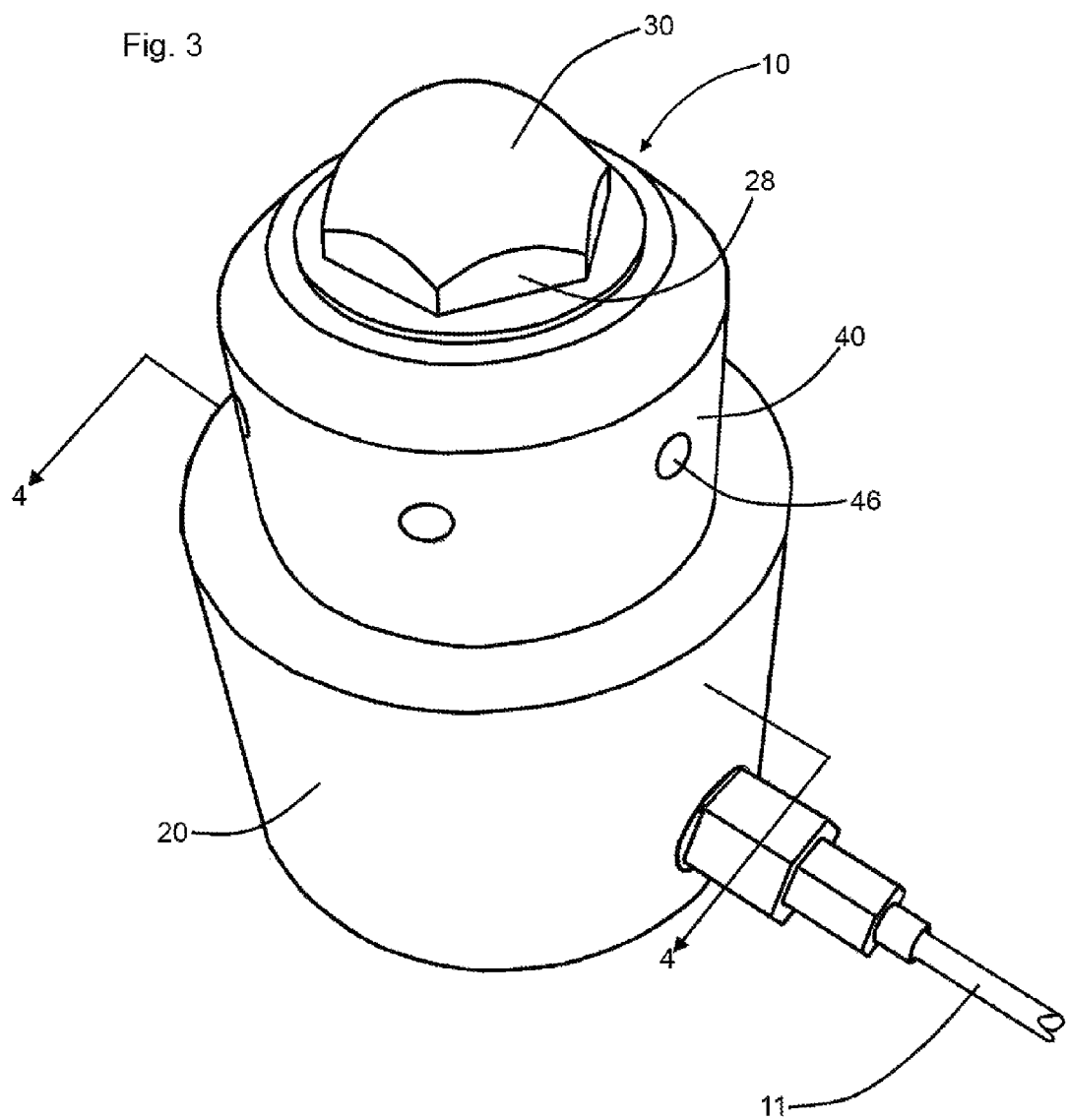
FIG. 3 is a perspective view of one of the hydraulic cylinder configured pedestals or feet of the instant inventive assembly.

Referring simultaneously to FIGS. 1, 3, and 4, cylinder pedestal 10 may comprise an upwardly opening cylinder 20,21 which forms an interior hydraulic fluid filled expansion space 22. The lower end of 24 of cylinder 20,21 bears directly against and rests upon the machine shop floor 26. An extension shaft 28 has an upper end 30 and a lower end 32, the upper end 30 being adapted for upward nesting receipt within and bearing support of the socket configured support point 1b of machine 1. The lower end 32 of the extension shaft functions as a sliding piston in relation to cylinder 20,21. A flange stop 34 prevents upward ejection of the extension shaft 28 from the cylinder 20,21.

The cylinder 20,21 has at least a first port 36 for injecting and ejecting hydraulic fluid 22, and such cylinder is preferably further opened by a pressure relief port 38. A nut 40 having internal helical threads 42 is preferably helically threadedly mounted in engagement with external helical threads 44 presented upon the extension shaft 28. Upon hydraulic fluid actuated positioning of the extension shaft 28 at a desired elevation, nut 30 may be turned counter-clockwise via engagement of a wrench (not depicted within views) with wrench jaw sockets 46, such turning preferably continuing until a downwardly facing land 48 upon nut 40 contacts an upwardly facing land 50 of cylinder 20,21. Upon such contact, pressure within hydraulic fluid 22 may be released and the weight of the machine 1 at bearing point 1b is advantageously alternatively borne mechanically by the floor 26 via a column of support including the cylinder 20,21, the nut 40, and the extension shaft 28. Upon inversion of the cylinder pedestal 10, and upon reconfiguration of surface 30 to provide stable floor support, the cylinder 20,21 may suitably alternatively serve as the cylinder pedestal's moveable vertical extension shaft.

Each cylinder pedestal among the cylinder pedestal matrix 2, 4, 6, 8, 10, 12, 14, 16, and 18 preferably function substantially identically with each other cylinder pedestal within the matrix. According to the function of such cylinder pedestals, and referring in particular to pedestal 10, a small excess fluid pressure within volume 22 over and above the weight of machine 1 exerted at bearing point 1b will cause the extension shaft 28 to move upward, slowly raising the bearing point 1b and portions of the machine 1 overlying that point. Conversely, a slight deficit in fluid pressure below such weight within volume 22 will allow bearing point 3 to slowly depress or lower.

Referring simultaneously to FIGS. 1, 3, and 4, a plurality of branch conduits 3, 5, 7, 9, 11, 13, 15, 17, and 19 are preferably provided, each branch conduit preferably comprising a small gauge hydraulic fluid carrying line which is rated for performance at a high fluid pressures. Each of the branch conduits 3-19 preferably has at least a first (and suitably multiple for facilitating a machine interchange function described below) cylinder end and a pump end. Each cylinder end is preferably connected in communication with one of the fluid ports of cylinder pedestals 2-18 in the manner of the hydraulic fluid port connection 11,23 depicted in FIG. 4.

Referring to FIG. 1, a plurality of first shutoff valves 3s, 5s, 7s, 9s, 11s, 13s, 15s, 17s, and 19s is preferably provided, each such valve preferably being operatively connected "in line" respectively with the branch conduits 3, 5, 7, 9, 11, 13, 15, 17, and 19. While the first shutoff valves may suitably comprise manually operable valves, for speed and convenience such valves are preferably electric solenoid actuated.

A manifold conduit 52 preferably has a cylinder end and a pump end, the cylinder end of the manifold conduit 52 being attached in common communication with the pump ends of the branch conduits 3, 5, 7, 9, 11, 13, 15, 17, and 19.

Pressurizing means capable of injecting hydraulic fluid into the pump end of the manifold conduit 52 are provided, such means preferably comprising a hydraulic pump 54 and motor means 56 combination, the motor means preferably comprising an electric motor. In the preferred embodiment, the motor means 56 and hydraulic pump 54 combination is capable of continuously maintaining hydraulic fluid pressure within the manifold conduit 52 at a level at least as great as the least pressure needed to raise the cylinder pedestal among the matrix 2-18 which bears a highest load.

Variable pressure relief means, preferably comprising an electrically modulated pressure relief valve 58, are provided, such means being connected operatively to the pump end of the manifold conduit 52. Such operative connection preferably allows the valve 58 to relieve or "bleed" hydraulic pressure from conduit 52 at varying rates.

Figure 2:
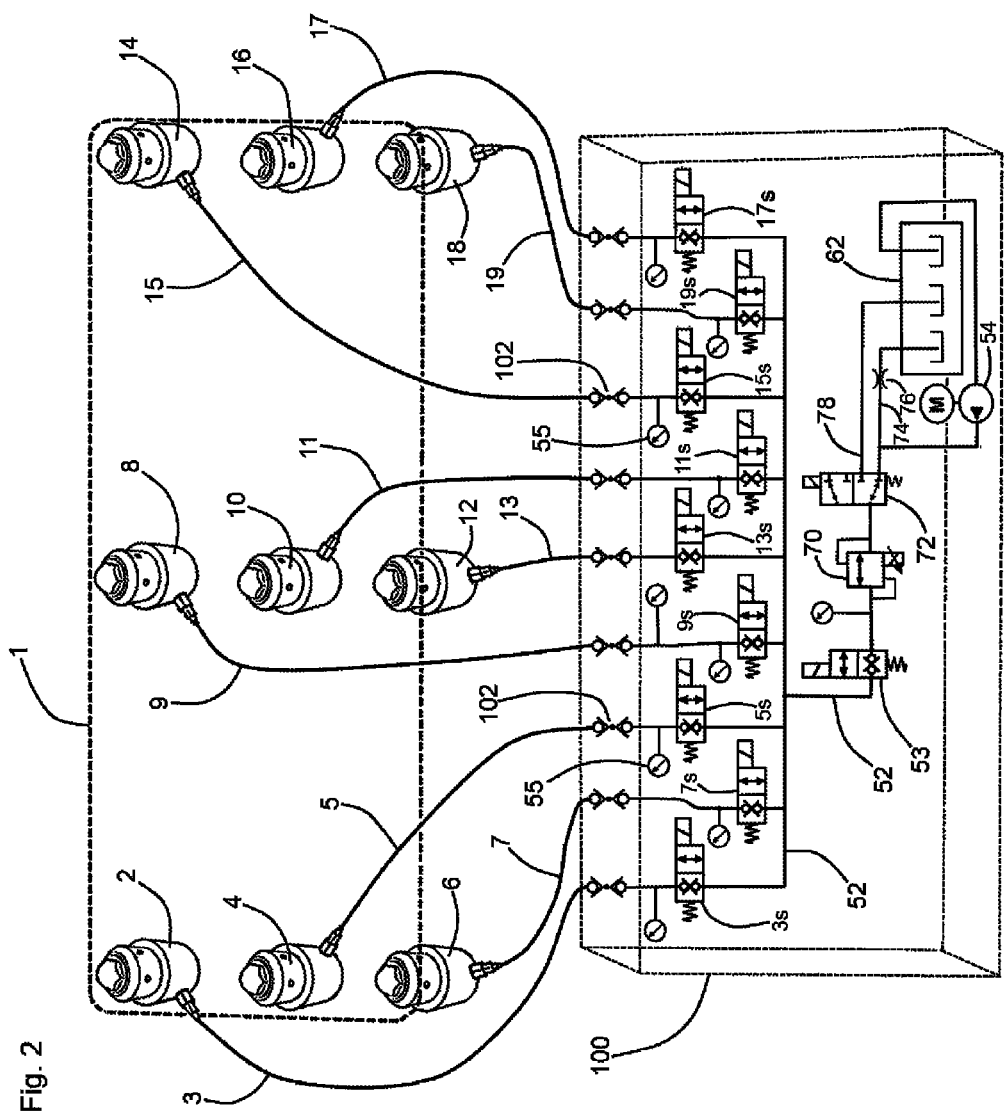
FIG. 2 redepicts the assembly of FIG. 1, the assembly of FIG. 2 alternatively positioning an alternatively configured variable relief valve.

Referring to FIGS. 1, 2, and 4, in operation of the instant inventive assembly, each of the first shutoff valves 3s-19s and a second manifold controlling shutoff valve 53 may be opened. Simultaneously with such valve openings, the variable relief valve 58 may be operated so that no pressure is bled or relieved from manifold conduit 52. Upon such assembly settings, each of the cylinder pedestals 2-18 may be maximally upwardly extended. Conversely, upon such valve openings, valve 58 may be operated in a manner which relieves pressure within conduit 52 down to a pressure which is less than the weight borne at the least burdened cylinder pedestal among the matrix 2-18. In that event, and upon such settings, each of the cylinder pedestals 2-18 downwardly depresses or retracts to a lowest level. The electrically modulated variable relief valve 58 preferably is of the type which may effectively operate along an infinitely variable range of pressures between the two levels of pressure relief described above, such infinite variability allowing the cylinder pedestals 2-18 to be infinitely variably raised and lowered to selected positions between their maximally depressed and their maximally raised levels.

The variable relief valve 58 may be alternatively operated at a setting which causes its output flow via output conduit 60 into hydraulic fluid reservoir 62 to match the output of hydraulic pump 54 into the pump end of the manifold conduit 52. Upon such flow matching, hydraulic fluid flow within the pump end of the manifold conduit 52 terminates, and advantageously allows "float" type trading of hydraulic fluid volumes between cylinder pedestals and groups of cylinder pedestals among matrix 2-18. For example, in the event that an operator observes that the left end of machine 1 is high and the right end of machine 1 is low, the operator may operate shutoff valves 9s, 11s, and 13s to lock off flow within branch conduits 9, 11, and 13, and the operator may leave valves 3s, 5s, 7s, 15s, 17s, and 19s open. Thereafter, the operator may mechanically raise the right end of machine 1 (by means other than hydraulic fluid injecting operation of cylinder pedestals 14, 16, and 18) causing the machine 1 to leftwardly pivot about the machine bearing points supported by the medial cylinder pedestals 8, 10, and 12. Such leftward pivoting motion simultaneously downwardly depresses the extension shafts of cylinder pedestals 2, 4, and 6, and causes their piston and cylinder combinations to function as a pumps which drive portions of their contained volumes of hydraulic fluid through branch conduits 3, 5, and 7, thence along the cylinder end of the manifold conduit 52, and thence into branch conduits 15, 17, and 19 for filling and expansion of the inner volumes of cylinder pedestals 14, 16, and 18. Accordingly, such left to right "float" type machine leveling function is facilitated by the instant inventive assembly. Front to rear float leveling between cylinder pedestal groups 2, 8, and 14, and 6, 12, and 18, may be similarly achieved with the lateral medial cylinder pedestal group 4, 10, and 16 locked. Opposite corner groupings of cylinder pedestals may similarly trade hydraulic fluid volumes in a float leveling fashion, with diagonal groupings of cylinders locked.

In any of the above described float leveling operations, the second electric solenoid actuated shutoff valve 53 may be alternatively closed, such closure allowing for termination of operation of the pump 54 and variable relief valve 58 during float leveling procedures.

In addition to the float type machine leveling functions which are facilitated by the instant inventive assembly, individual cylinder pedestals or groupings of cylinder pedestals may be selectively raised or lowered in a manner which alters the cumulative volume of hydraulic fluid within the matrix 2-18. For example, an operator may observe or deduce that the middle of machine 1 is undesirably deflected downwardly in relation to the machine's left and right ends. In such circumstances, the operator may move valves 3s, 5s, 7s, 15s, 17s, and 19s to their closed positions, and may open valves 9s, 11s, and 13s. Thereafter, upon opening the second shutoff valve 53 and upon depressing or minimizing the function of the variable relief valve 58, additional hydraulic fluid pressure is advantageously communicated via the portion of manifold conduit 52 which communicates with branch conduits 9, 11, and 13 to upwardly extend cylinder pedestals 8, 10 and 12. Upon reaching a suitable additional upward extension, shutoff valves 9s, 11s, and 13s may be moved to their closed positions. In manners similar to the steps described above, any single cylinder pedestal within matrix 2-18, and any group of such cylinder pedestals may be advantageously precisely raised or lowered in relation to other cylinder pedestals which have been locked down.

Referring further to FIG. 1, a plurality of pressure gauges 55 are preferably connected to the branch conduits 3-19 and/or to the manifold conduit 52, such pressure gauges 55 assisting in correlating individual elevations at the contact points of cylinder pedestals 2-18 with pressures experienced within the cylinder pedestals located at such contact points.

Referring further to FIG. 1, a matrix of hydraulic fluid carrying lines 60,61 incorporates reservoir 62 and facilitates cycling of fluid between variable relief valve 58 and pump 54.

Referring to the alternate assembly configuration of FIG. 2, each structure having a reference numeral corresponding to one found in FIG. 1 is configured substantially identically with the similarly numbered structure. In the alternative FIG. 2 assembly, an alternative electrically modulated variable relief valve 70 constitutes a two way valve which is capable of bleeding or relieving hydraulic pressure from the pump end of manifold conduit 52 into reservoir 62, and is capable of alternatively modulating pressure injected by pump 54 into manifold conduit 52. Upon positioning of a selector valve 72 as indicated in FIG. 2, valve 70 may infinitely variably and selectively divide pressure supplied by pump 54 between manifold conduit 52 and a return line 74 which is controlled by a flow restrictor 76. Alternatively, upon moving valve 72 to its second position, the variable relief valve 70 may slowly bleed or relieve pressure from manifold conduit 52 into a purge line 78 for return to reservoir 62. The alternate assembly of FIG. 2 is seen as suitable because it is capable of facilitating all of the functions described above in relation to the FIG. 1 assembly of FIG. 1. However, the FIG. 2 assembly is less desirable because of its requirements provision of and time consuming operations of selector valve 72.

Referring to FIG. 1, the dashed line box 100 is representative of a control case which may conveniently and advantageously house and support for actuation any or all of the components drawn within the box's interior. Quick disconnect flow checking couplers 102 are preferably installed in line upon the branch conduits 3-19. Provided that the pump side halves of the couplers 102 are mounted upon and exposed at an outer wall of the control case 100, each of the branch conduits 3-19 may be easily and conveniently "plugged-in" to the control case for machine leveling operation.

Figure 5:
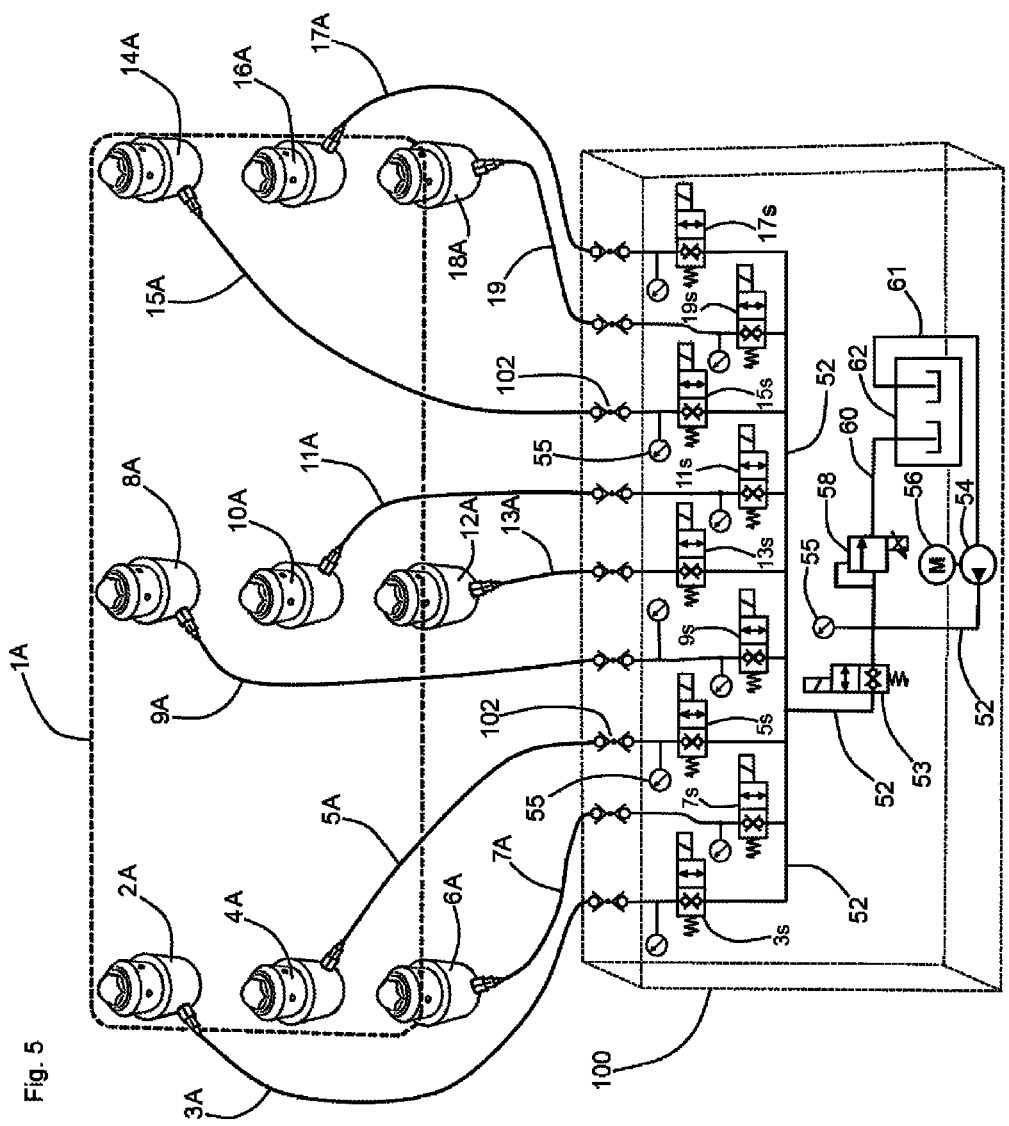
FIG. 5 re-depicts the structure of FIG. 1, the view of FIG. 5 representing cylinder end structures as interchangeable components.

The control case 100 is preferably wheel mounted and is portable, allowing multiple machines and cylinder pedestal matrixes to be served via connections and disconnections of the matrixes' sets of branch conduits. Referring to FIG. 5, machine 1A, matrix 2A-18A, and their branch conduits 3A-18A are representative of a plurality of second machines and second cylinder pedestal matrixes which may comprise a part of and may be individually leveled by the instant inventive assembly. Provision of such multiple cylinder pedestal matrixes multiplies the number of the ends of each branch conduit component of the assembly. Upon such multiplication of the cylinder ends of the branch conduits, control case interchangeability is achieved by correspondingly multiplying the cylinder halves of the quick disconnect flow checking couplers 102. In a preferred embodiment, and in order to allow the control case 100 assembly to plug into and interchangeably attach to the various cylinder pedestal matrixes 2-18 and 2A-18A, each coupler 102 has a cylinder half for each branch conduit end.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. An assembly for hydraulic fluid actuated machine leveling, the machine having a base, the assembly comprising:
    (a) a plurality of hydraulic cylinders, each cylinder among the plurality of hydraulic cylinders comprising an upper end adapted for supporting the machine's base, a lower end, a shaft, and a fluid port opening the cylinder;
    (b) a plurality of branch conduits, each conduit among the plurality of branch conduits having a cylinder end and a pump end, each branch conduit being connected in communication with one of the hydraulic cylinders' fluid ports;
    (c) a plurality of first shutoff valves, each valve among the plurality of first shutoff valves being connected operatively to one of the branch conduits for alternatively permitting and resisting flows of the hydraulic fluid within said one of the branch conduits;
    (d) a manifold conduit having a cylinder end and a pump end, the manifold conduit's cylinder end being connected in communication with the branch conduits' pump ends;
    (e) pressurizing means connected operatively to the manifold conduit's pump end, the pressurizing means being adapted for raising the pressure of hydraulic fluid at the manifold conduit's pump end to a shaft extending pressure; and
    (f) pressure relief means connected operatively to the manifold conduit's pump end, the pressure relief means being adapted for alternatively raising and lowering the pressure of the hydraulic fluid within the manifold conduit between the shaft extending pressure and a shaft retracting pressure, the shaft retracting pressure being less than the shaft extending pressure.

2. The assembly for hydraulic fluid actuated machine leveling of claim 1 further comprising a plurality of pressure gauges, each pressure gauge among the plurality of pressure gauges being connected operatively to one of the conduits among the plurality of branch conduits and the manifold conduit.

3. The assembly for hydraulic fluid actuated machine leveling of claim 1 wherein each shutoff valve among the plurality of first shutoff valves comprises an electric solenoid actuated shutoff valve.

4. The assembly for hydraulic fluid actuated machine leveling of claim 3 further comprising a second shutoff valve connected operatively to the manifold conduit.

5. The assembly for hydraulic fluid actuated machine leveling of claim 4 wherein the second shutoff valve comprises an electric solenoid actuated shutoff valve.

6. The assembly for hydraulic fluid actuated machine leveling of claim 5 wherein the pressure relief means comprise an electrically modulated variable relief valve.

7. The assembly for hydraulic fluid actuated machine leveling of claim 6 wherein the pressurizing means comprise a hydraulic pump and motor means combination.

8. The assembly for hydraulic fluid actuated machine leveling of claim 7 wherein the manifold conduit's pump end extends from the second electronic solenoid actuated shutoff valve to the electrically modulated variable relief valve, and wherein the pressurizing means' operative connection to the manifold conduit is positioned between the second electric solenoid actuated shutoff valve and the electrically modulated variable relief valve.

9. The assembly for hydraulic fluid actuated machine leveling of claim 8 further comprising a hydraulic fluid reservoir and a network of hydraulic fluid cycling lines, the network of hydraulic fluid cycling lines operatively interconnecting the electrically modulated pressure relief valve, the hydraulic pump and motor means combination, and the hydraulic fluid reservoir.

10. The assembly for hydraulic fluid actuated machine leveling of claim 9 further comprising a control case, the control case housing components selected from the group consisting of the pump ends of the branch conduits, the electric solenoid actuated shutoff valves, pressure gauges, the electrically modulated variable relief valve, the hydraulic pump, the motor means, and the hydraulic fluid reservoir.

11. The assembly for hydraulic fluid actuated machine leveling of claim 10 wherein the plurality of hydraulic cylinders comprises a first hydraulic cylinder matrix and further comprising a plurality of second machines and second hydraulic cylinder matrixes, each machine among the plurality of second machines being supported by one of the cylinder matrixes among the plurality of second hydraulic cylinder matrixes, wherein each branch conduit has a plurality of cylinder ends, each cylinder end of each branch conduit being connected in communication with one of the cylinders among the first and second hydraulic cylinder matrixes.

12. The assembly for hydraulic fluid actuated machine leveling of claim 11 further comprising a plurality of hydraulic line couplers, each hydraulic line coupler being connected operatively to one of the branch conduits.

13. The assembly for hydraulic fluid actuated machine leveling of claim 12 wherein each hydraulic line coupler comprises a pump side half and a plurality of cylinder side halves, each of the couplers' cylinder side halves being mounted operatively with respect of one of the cylinders among the first and second hydraulic cylinder matrixes.

14. The assembly for hydraulic fluid actuated machine leveling of claim 13 wherein each of the couplers' pump side halves is mounted upon the control case.

* * * * *